United States Patent [19]

Frankfort et al.

[11] 4,119,815

[45] Oct. 10, 1978

[54] CENTRAL STATION SYSTEM INCLUDING SECONDARY COMMUNICATION PATH ESTABLISHED THROUGH COMMERCIAL TELEPHONE NETWORK

[75] Inventors: Eric J. Frankfort, Brooklyn, N.Y.; David Stuart Terrett, Lincroft, N.J.

[73] Assignee: American District Telegraph Company, Jersey City, N.J.

[21] Appl. No.: 801,822

[22] Filed: May 31, 1977

[51] Int. Cl.[2] .................... G08B 29/00; G08B 26/00; H04M 11/00
[52] U.S. Cl. .................... 179/175.3 S; 179/2 A; 179/5 R; 179/18 EA; 340/147 SC; 340/292
[58] Field of Search .............. 179/5 P, 5 R, 2 R, 2 A, 179/2 AM, 2 C, 18 EA, 170 C, 175.3 S; 340/147 SC, 150, 292, 408

[56] References Cited

U.S. PATENT DOCUMENTS

| 465,989 | 12/1891 | Chase | 340/288 |
|---|---|---|---|
| 1,606,795 | 11/1926 | Johnson et al. | 179/170 C |
| 2,919,435 | 12/1959 | Hawley | 340/150 |
| 2,981,930 | 4/1961 | Staples et al. | 340/292 |
| 2,985,871 | 5/1961 | Bemis | 340/286 R |
| 3,214,734 | 10/1965 | Whitehead | 340/163 |
| 3,569,635 | 3/1971 | Bloch et al. | 179/2 R |
| 3,742,154 | 6/1973 | Bidlach et al. | 179/175.3 S |
| 3,899,641 | 8/1975 | Etra | 179/18 EA |

FOREIGN PATENT DOCUMENTS 259,589  10/1926  United Kingdom ............... 179/170 C

OTHER PUBLICATIONS

"Preliminary Technical Information on a New Voice-band Service Offering under Consideration by AT&T", Nov. 10, 1975.

*Primary Examiner*—Kathleen H. Claffy
*Assistant Examiner*—Kenneth A. Chayt
*Attorney, Agent, or Firm*—Charles B. Smith; Robert R. Jackson

[57] ABSTRACT

A central station system in which the central station is normally connected to one or more remotely located bridging points by a dedicated communication path, each bridging point having a plurality of output ports to which one or more remote station devices are connected. In response to address signals generated by the central station, a bridging point connects an identified output port to the dedicated communication path to allow communication between the associated remote stations and the central station. All other output ports are electrically isolated from the dedicated communication path. In the event of failure of the dedicated communication path, apparatus is provided for establishing an alternate communication path through the commercial telephone network. The system is highly immune to tampering and other forms of failure because of automatic decision-making capabilities of the bridging point and other features of the apparatus.

18 Claims, 5 Drawing Figures

CENTRAL STATION SYSTEM INCLUDING SECONDARY COMMUNICATION PATH ESTABLISHED THROUGH COMMERCIAL TELEPHONE NETWORK

This invention relates to central station systems, and more particularly to central station systems which make economical use of the communication paths between the central and remote stations and which are highly immune to breakdown, sabotage, or other forms of failure.

Central station systems typically include a central station and a plurality of remotely located remote stations. Each remote station may be connected directly to the central station by a separate communication path, or several remote stations may be connected in series along a single communication path or loop. To conserve communication apparatus, several remote stations in a particular area may be connected to a convenient common point, referred to herein as a bridging point, which is connected to the central station by a single communication path. The remote stations connected to the bridging point then effectively share the single, relatively long communication path from the bridging point to the central station. A central station may have a number of such satellite bridging points, thereby effecting a considerable saving in communication apparatus.

A central station system may be of the type in which the central station merely receives signals from the remote stations and displays or otherwise indicates the nature of those signals to the operator of the system. Alternatively, the central station system may be of the type in which the central station periodically interrogates the remote stations and the remote stations respond when interrogated by transmitting signals indicating their status. Again, the central station typically indicates the nature of the signals received from the remote station for the operator of the system. In either case, the central station may also initiate other action appropriate to the remote station signals received. For example, the central station may transmit an alarm signal to police or fire authorities.

Central station systems have a wide variety of applications. They may be used as alarm systems, in which case the remote stations may monitor one or more alarm conditions (e.g., smoke, fire, unauthorized entry, refrigeration loss, etc.) at the remote station locations. Central station systems may also be used to monitor conditions throughout an electric power distribution network, a pipeline system, or any other physically large or extensive distribution or processing system. In some applications, the central station may transmit signals to the remote station to cause certain operations to be performed at the remote station in addition to receiving signals from the remote stations.

Although the principles of this invention are applicable to all of the many types of central station systems mentioned above, the invention will be fully understood from an explanation of its application to central station alarm systems.

As suggested above, it is generally desirable for economic reasons to conserve communication apparatus by connecting remote stations in a given area to a bridging point which is then connected to the central station by a single communication path. This has the disadvantage that it may be possible to interrupt communication with all of the remote stations connected to the bridging point by tampering with one remote station. For example, application of strong noise signals to the bridging point from one remote station may make it impossible to communicate with all other remote stations connected to that bridging point. In addition, the integrity of the communication path between the central station and a bridging point becomes increasingly important as the number of remote stations served by the bridging point increases. Failure of such a communication path can mean complete loss of communication with a large number of remote stations.

The geographical distribution of remote stations may vary widely from one application to another. Assuming the use of bridging points as mentioned above, a central station system desirably accommodates a varying geographical distribution of such bridging points.

Particularly in the case of central station alarm systems, there are a wide variety of alarm conditions which it may be necessary to monitor. These various alarm conditions may be detected by a wide variety of remote station devices. For example, a plurality of fire alarm stations may be connected to a McCulloh loop as shown in U.S. Pat. No. 253,080 and several more recent disclosures such as U.S. Pat. No. 3,652,867. As another example, several direct-wire burglar alarms may be connected to a bridging point. Some of this remote station apparatus may be modern and compatible with modern central station apparatus; other remote station apparatus may be incompatible with modern central station apparatus. A central station system desirably accommodates a wide variety of remote station devices to provide a wide range of services.

In view of the foregoing, it is an object of this invention to provide improved central station systems.

It is a more particular object of this invention to provide central station systems which are highly immune to tampering, sabotage, or other forms of failure.

It is another more particular object of this invention to provide central station systems in which geographically proximate remote stations are served from a bridging point, but in which the remote stations served from a bridging point are electrically isolated from one another so that tampering with or failure of one remote station does not interfere with communication with all of the other remote stations.

It is another more particular object of this invention to provide central station systems with relatively inexpensive alternative communication paths between the central and remote station apparatus in the event of failure of the principal communication path.

It is another more particular object of this invention to provide central station systems which can accommodate a wide variety of remote station devices having any geographical distribution.

SUMMARY OF THE INVENTION

These and other objects of the invention are accomplished in accordance with the principles of the invention by providing a central station system including one or more central station transmitter-receivers, each connected by a dedicated primary communication path to one or more cascaded bridging points. Each bridging point includes a plurality of addressable output ports which are electrically isolated from one another. One or more remote stations are connected to each output port, either directly or through a buffer device. The buffer device may be required to render the output signals of the remote station or stations connected to it compatible with the remainder of the system. The buffer device may also store the output signals of the associated remote station or stations until that information is called for by the central station and the buffer device is accordingly connected to the central station through the bridging point. Because the output ports of all the bridging points are electrically isolated from one another, tampering with one remote station can at most affect communication with the remote stations connected to that output port (either directly or through a buffer device).

To prevent control or "capture" of the system from a remote station, the system preferably does not accept bridging point connection commands from any point beyond the output ports of the bridging points. In addition, the bridging points are designed to automatically disconnect the central station from an output port a predetermined time interval after connection to that output port is made.

In the event of failure of any portion of the dedicated primary communication path from a central station transmitter-receiver to the associated bridging points, the transmitter-receiver can be connected to the bridging point or points beyond the failure point by a secondary communication path established through the commercial telephone network. A commercial telephone termination is associated with each central station transmitter-receiver and with each bridging point. (Each commercial telephone termination at the central station may be shared by two or more central station transmitter-receivers, but for convenience herein it will be said that a termination is associated with each central station transmitter-receiver.) When it is necessary to establish a secondary communication path between the central station transmitter-receiver and a bridging point, the number of the commercial telephone termination associated with the bridging point is dialed from the commercial telephone termination at the central station. When the two terminations are connected through the commercial telephone network, access code signals are transmitted to the bridging point via the secondary communication path thus established. The access code signals must be transmitted within a predetermined time interval. If the bridging point accepts the access code signals, command code signals can then be transmitted to the bridging point via the secondary communication path. By means of these command code signals, the bridging point can be instructed to disconnect itself from the dedicated primary communication path leading back to the central station and to communicate with the central station via the secondary communication path instead. Other special commands can be transmitted to the bridging point in this manner if desired. At the central station, the transmitter-receiver is connected to the dedicated primary communication path when communicating with bridging points between the central station and the failure point, and to the secondary communication path when communicating with bridging points beyond the failure point. Various protective arrangements can be provided in addition to the requirement that a correct access code be transmitted to prevent unauthorized access to the bridging points via the commercial telephone network. Key elements of the bridging points can be provided in duplicate to protect the system against the failure of any of the duplicated elements. The bridging point can be switched from its primary to its secondary elements or vice versa by commands from the central station.

Further features of the invention, its nature and various advantages will be more apparent from the accompanying drawing and the following detailed description of the invention.

DETAILED DESCRIPTION OF THE INVENTION

Figure 1:
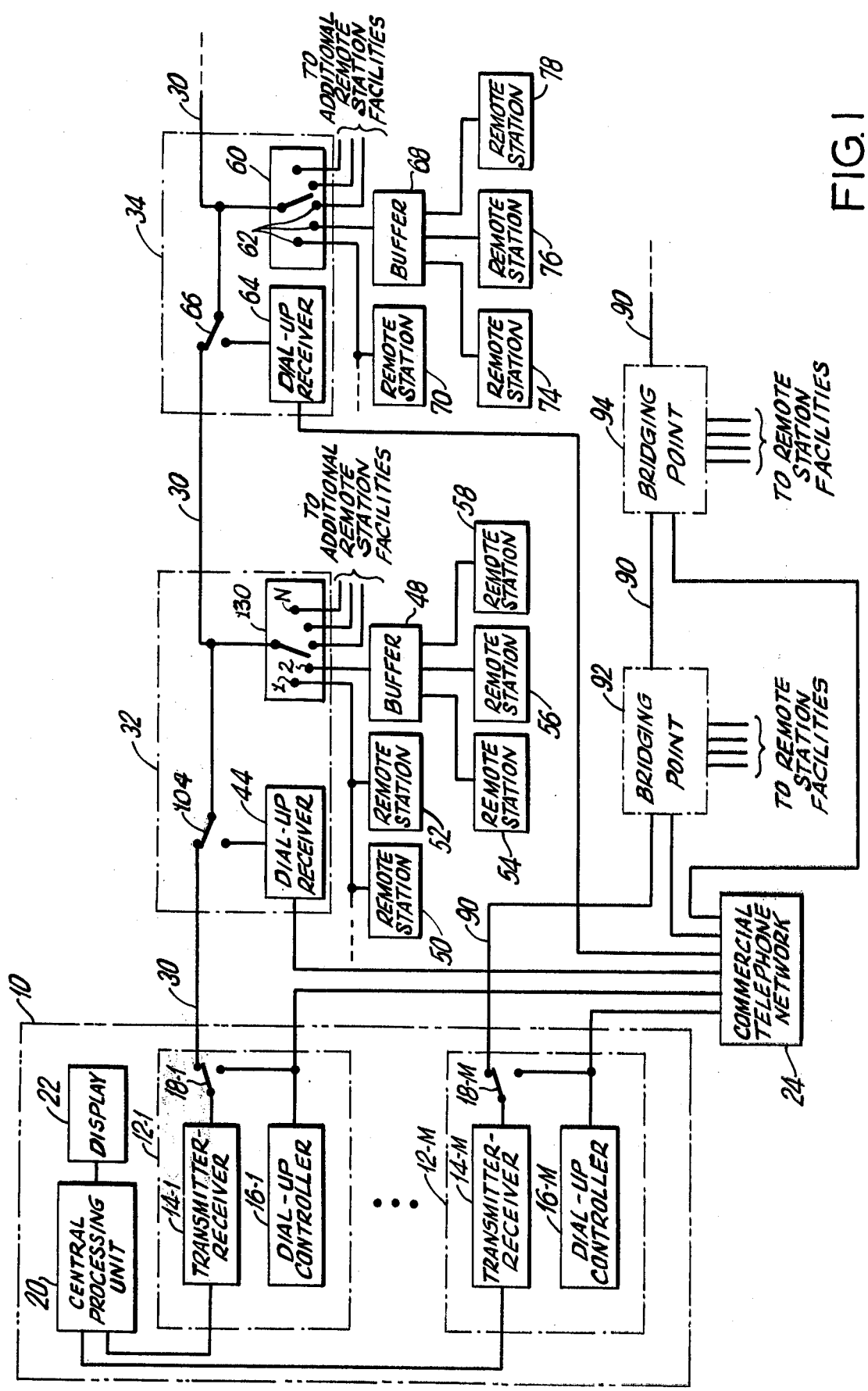
FIG. 1 is a schematic block diagram showing a central station system constructed in accordance with the principles of this invention.

As shown in FIG. 1, a central station system constructed in accordance with the principles of this invention includes central station 10 and a plurality of remotely located bridging points 32, 34, 92, 94, etc. Each bridging point has a plurality of output ports (represented in FIG. 1 by the multiple contacts 1, 2, . . . , N of switch 130 and the similar multiple contacts 62 of switch 60) to which one or more remote stations 50, 52, 54, 56, 58, 70, 74, 76, 78, etc., are connected either directly or through buffer devices 48, 68, etc.

Central station 10 includes one or more central station transmission units 12-1 through 12-M, each communicating with one or more bridging points located along the length of a dedicated communication path. For example, central station transmission unit 12-1 communicates with bridging points 32, 34, etc., located along the length of dedicated communication path 30, and central station transmission unit 12-M communicates with bridging points 92, 94, etc., located along the length of dedicated communication path 90. The dedicated communication paths are the normal or primary communication paths between central station transmission units 12 and the associated bridging points. In the event of failure of a dedicated communication path, however, central station transmission units 12 include apparatus described below for establishing secondary communication paths through commercial telephone network 24. In a typical system, the dedicated communication paths extend outward from the central station, thereby connecting a large number of widely distributed bridging points with a minimum of dedicated communication path plant.

Each central station transmission unit 12 includes a transmitter-receiver (respectively 14-1 through 14-M), a secondary communication path dial-up controller (respectively 16-1 through 16-M), and a switch (respectively 18-1 through 18-M) for normally connecting the transmitter-receiver to the associated dedicated communication path or alternatively to a secondary communication path established when necessary by the associated dial-up controller. Each of dial-up controllers 16 is connected to commercial telephone network 24 by way of an ordinary commercial telephone line termination at the central station. Dial-up controllers 16 may be any device capable of generating dial signals recognizable by the switching apparatus of commercial telephone network 24. For example, controllers 16 may include a telephone instrument with a conventional rotary dial or push button array for respectively generating dial pulses or audio tones (e.g., Touch-Tone audio tones used as dial signals by the operating companies of the American Telephone and Telegraph Company). For convenience herein, all such devices will be referred to as dials or dial mechanisms even though some systems (e.g., those with push button arrays) may not include an actual rotary dial. Similarly, as used herein, dial signals mean dial pulses or audio tones such as the above-mentioned Touch-Tone signals.

Although a separate dial-up controller 16 and commercial telephone termination is associated with each of transmitter-receivers 14 in the particular embodiment shown in FIG. 1, two or more transmitter-receivers can share a dial-up controller and commercial telephone termination through an appropriate switching arrangement which allows any of the transmitter-receivers to be connected to the telephone termination. As used herein and in the appended claims, the statement that a dial-up controller and/or commercial telephone termination is associated with each transmitter-receiver means either the unique association shown in FIG. 1 or the alternative shared association described in detail above.

Each of transmitter-receivers 14 operates substantially independently to generate signals normally applied to the dedicated communication path to address the associated bridging points and the output ports thereof in any desired succession (e.g., sequentially, randomly, etc.) and to receive and process signals transmitted back from the remote stations or remote station buffers connected to the addressed bridging point output ports. Each of transmitter-receivers 14 may therefore be a suitably programmed general purpose digital computer or comparable special purpose sequential logic apparatus capable of alternately generating address signals and receiving and processing reply signals.

All of transmitter-receivers 14 are conveniently monitored by a single central processing unit 20. In general, transmitter-receivers 14 indicate to central processing unit 20 only those conditions of the system requiring attention, for example, signals received from a remote station indicating that attention to the remote station is required or signals indicating that communication with one or more bridging points or remote stations has been interrupted. In the case of a central station alarm system, for example, transmitter-receivers 14 typically indicate only alarm conditions detected by the remote stations and service interruptions. Central processing unit 20 further processes this information to verify that attention is in fact required. Taking again the example of a central station alarm system, a burglar alarm signal generated by a remote station may or may not require attention depending on the time of day and/or day of the week. Central processing unit 20 takes such factors into account in processing the signals produced by transmitter-receivers 14. Information regarding conditions determined by central processing unit 20 to warrant attention is displayed by display device 22 under the control of central processor 20. This information is used by the operator of the system to initiate appropriate action (e.g., dispatch personnel to the location of a remote station requiring attention). Alternatively or in addition, central processing unit 20 may automatically initiate appropriate action (e.g., transmit an alarm to police or fire authorities). Central processing unit 20 may be a suitably programmed general purpose digital computer or comparable special purpose logic apparatus capable of processing the output signals of transmitter-receivers 14 and controlling display device 22.

Because all of central station transmission units 12-1 and associated apparatus are similar, only transmitter-receiver 12-1 and the apparatus associated therewith will be discussed in further detail below.

As mentioned above, central station transmission unit 12-1 communicates with bridging points 32, 34, etc., located along the length of dedicated communication path 30. In a preferred embodiment, dedicated communication path 30 is a voice-grade transmission line or conductor pair similar to a conventional commercial voice-grade telephone transmission line, e.g., a voice-grade line of the type identified by the American Telephone and Telegraph Company as a 3002 basic conditioned line. Communication path 30 may be a privately owned line or it may be a line leased from the commercial telephone company. In the latter case, communication path 30 may be part of commercial telephone network 24, but it is preferably a dedicated as opposed to a switched line. Alternatively, communication path 30 may be any other form of communication link such as a microwave or radio link.

Although only two bridging points 32 and 34 are shown located along dedicated communication path 30, it will be understood that additional bridging points can be located along the communication path if desired.

Each of bridging points 32 and 34 includes a remotely controllable switch (respectively 130 and 60), a dial-up receiver (respectively 44 and 64) connected to commercial telephone network 24 by way of an ordinary commercial telephone line termination at the bridging point, and a switch (respectively 104 and 66) normally positioned to complete the circuit of dedicated communication path 30 through the bridging point. In the event of failure of any portion of dedicated communication path 30, the switch 104 or 66 in the bridging point beyond the failure point is repositioned to connect bridging points beyond the failure point back to the central station by way of a secondary communication path which is established when necessary through the associated dial-up receiver 44 or 64 and commercial telephone network 24.

As mentioned previously, the output ports of bridging points 32 and 34 are represented schematically by the multiple contacts 1-N of switch 130 and the similar multiple contacts 62 of switch 60, respectively. The common contact of switches 130 and 60 may be thought of as the input ports of bridging points 32 and 34. Although switches 130 and 60 are shown in FIG. 1 as electro-mechanical devices, it will be understood that any type of switches (e.g., solid state switches) can be used. In any event, output ports 1-N and 62 are all electrically isolated from one another. In addition, switches 130 and 60 are preferably constructed so that all of output ports 1-N and 62 can be electrically isolated from the communication path leading back to the central station.

One or more remote stations 50, 52, 54, 56, 58, 70, 74, 76, 78, etc., are connected to each of contacts 1-N and 62, either directly (as in the case of remote stations 50 and 52 connected directly to contact 1, or remote station 70 connected directly to left-most contact 62) or through a remote station buffer device (as in the case of remote stations 54, 56, and 58 connected through buffer 48 to contact 2, or remote stations 74, 76, and 78 connected to the next left-most contact 62 through buffer 68). Buffers 48 and 68 typically monitor and store the status of all the remote stations connected to them. The buffer may be at the location of the bridging point, or it may be located remotely from the bridging point. In the latter case, the buffer may serve a plurality of nearby remote stations and thereby act as a line concentrator for those remote stations.

Buffers may also be used to render the output signals of a wide variety of remote station devices compatible with the requirements of the remainder of the central station system. For example, many known remote station devices produce output signals only when an alarm condition is first detected. Since the central station apparatus of this invention is connected to only one bridging point output port at any time, the alarm signals produced by such a remote station will not be received by the central station if (as is likely) the central station is not connected to the associated output port when the alarm signal is produced. A buffer is therefore required to receive the alarm signal when it is produced and to store information representative of that alarm signal until the associated bridging point output port is connected to the central station and the central station calls for that information. Other known remote station devices produce coded alarm signals at relatively slow speeds. A buffer is also desirable for use with these devices to accumulate the coded alarm signals for retransmission at higher speeds. In this way, the transmission line plant can be made to serve more remote stations.

On the other hand, the remote stations connected directly to bridging point output ports are those capable of reporting their status (or any change in status) by means of signals compatible with the remainder of the system whenever the associated output port is connected to the central station and the central station calls for that information.

In response to address signals generated by transmitter-receiver 14-1, one of switches 40 or 60 connects the output port 1-N or 62 identified by the address signals to the associated bridging point input port. The remote station or remote station buffer connected to the selected output port is thereby connected to the communication path leading back to the central station, while all the other output ports (and the remote station apparatus connected thereto) remain electrically isolated from the central station. The address signals generated by transmitter-receiver 14-1 may conveniently include a bridge address portion identifying the bridging point at which the output port connection is to be made, and an output port portion identifying the output port at the selected bridging point to be connected to the communication path leading back to the central station.

After an output port has been connected to the central station as described above, transmitter-receiver 14-1 may generate additional signals (referred to herein as interrogation signals) which are transmitted to the remote station apparatus connected to the selected output port, the remote station apparatus connected to the selected output port may transmit signals (referred to herein as reply signals) back to transmitter-receiver 14-1, or both types of further signalling may occur depending on the nature of the central station system and the requirements of its application. Typically, transmitter-receiver 14-1 first generates interrogation signals identifying a particular remote station connected to the addressed output port. The identified remote station, or the buffer to which the addressed remote station is connected, recognizes the interrogation signal and responds by transmitting reply signals indicative of the status of the identified remote station. For example, in the case of a central station alarm system, the reply signal may indicate the detection of any of a variety of alarm conditions such as smoke, fire, unauthorized entry, etc.; or the reply signal may indicate that no alarm condition has been detected and that the status of the remote station is normal. The reply signal generated by the identified remote station, or the buffer to which the identified remote station is connected, may also include a repetition of the remote station identification to enable transmitter-receiver 14-1 to confirm that the reply signal was received from the proper remote station.

The reply signals thus generated are transmitted back to transmitter-receiver 14-1. After each addressing and interrogation operation, transmitter-receiver 14-1 waits a predetermined interval of time to receive a reply signal. If no reply signal is received within that time or if the reply signal received is incomplete or unrecognizable, transmitter-receiver 14-1 may repeat the addressing and interrogation operation. If after a predetermined number of attempts, no satisfactory reply signal is received, transmitter-receiver 14-1 produces output signals applied to central processing unit 20 indicating that the interrogated remote station cannot be made to reply properly. Central processing unit 20 causes display 22 to indicate this fact to the operator of the system. Transmitter-receiver 14-1 then proceeds with the successive addressing and interrogation of remote stations.

If a proper reply signal is received by transmitter-receiver 14-1, the transmitter-receiver processes that signal to determine whether the status indicated warrants attention at the remote station. For example, transmitter-receiver 14-1 may compare the reply signal with each of the possible status signals producible by the addressed remote station. Associated with each of the possible status signals, transmitter-receiver 14-1 stores instructions which are followed when the reply signal matches the associated possible status signal. In the case of a central station alarm system, these instructions may cause transmitter-receiver 14-1 to indicate a particular alarm condition to central processing unit 20. Central processing unit 20 may further process this alarm indication, and if attention is required at the remote station, central processing unit 20 causes display 22 to display appropriate information to the operator of the system. To increase reliability, a reply signal indicating a change in the status of a remote station may cause one or more reinterrogations of that remote station. If the same reply signal is received again in response to each interrogation, the change in status is confirmed and the reply signal is processed as described above. If a different reply signal is received, a malfunction is indicated. In any event, after the reply signal has been processed, transmitter-receiver 14-1 continues the successive addressing and interrogation of remote stations.

If a reply signal cannot be obtained from a remote station or buffer, the most likely causes are failure or sabotage of that remote station or buffer or the communication path from the bridging point output port (1-N or 62) to the remote station or buffer. Attention to the remote station or buffer or the local communication path will generally be required to remedy the problem. However, the remaining major portion of the apparatus continues to function normally despite such local failures.

If reply signals cannot be obtained from all of the remote stations connected to a given bridging point, the most likely cause is failure of dedicated communication path 30 at some point between the bridging point (if any) farthest from central station 10 along communication path 30 which is unaffected and the bridging point nearest central station 10 which is affected. Because of the series connection of bridging points along communication path 30, all bridging points beyond the nearest affected bridging point will be similarly affected if the problem is in fact caused by interruption of communication path 30.

When a fault of this kind occurs, communication with the affected bridging points is re-established by means of a secondary communication path through commercial telephone network 24. Dial-up controller 16-1 is operated either manually or automatically under the control of either central processing unit 20 or transmitter-receiver 14-1 to obtain dial tone at the commercial telephone termination associated with dial-up controller 16-1 and to dial the number of the commercial telephone termination associated with the dial-up receiver (44 or 64) at the nearest affected bridging point. Commercial telephone network 24 connects these two telephone terminations by conventional line switching and applies a ringing signal to the latter termination. The dial-up receiver responds to the ringing signal by switching to an off-hook condition which terminates the ringing signal. An open voice-grade secondary communication path is now established between dial-up controller 16-1 and the dial-up receiver. In a preferred embodiment, dial-up controller 16-1 then transmits an access code signal over the secondary communication path to the dial-up receiver. If the proper access code is transmitted to the dial-up receiver within a predetermined time interval, the dial-up receiver is conditioned to accept command signals from dial-up controller 16-1. Otherwise, the dial-up receiver reverts to its original on-hook condition, thereby breaking the secondary communication path. In this way, unauthorized individuals who may dial the number of the dial-up receiver but who do not know the correct access code are prevented from gaining access to the system through the commercial telephone network. The access code signals may be a further series of dial signals produced by the dial mechanism of dial-up controller 16-1 operated either automatically or manually.

When the correct access code signals are received, the dial-up receiver is ready to receive additional command signals. Like the access code signals, these command signals may be a further series of dial signals produced by the dial mechanism of dial-up controller 16-1. Again, the dial mechanism of controller 16-1 may be operated either manually or automatically to produce these command signals. Although additional command codes may be provided as discussed below, there is at least a connection command code which causes the dial-up receiver to operate the associated switch 104 or 66 to disconnect the input port of the bridging point from the portion of dedicated communication path 30 which leads back to transmitter-receiver 14-1, and to connect the input port of the bridging point to the secondary communication path through dial-up receiver 44 or 64 and commercial telephone network 24. Thereafter, when it is desired to communicate with remote stations connected to this bridging point and bridging points beyond this bridging point along communication path 30, switch 18-1 is first operated to disconnect transmitter-receiver 14-1 from communication path 30 and to connect it instead to the secondary communication path. To communicate with remote stations connected to bridging points nearer central station 10 than the bridging point to which the secondary communication path connection has been made, switch 18-1 is positioned normally to connect transmitter-receiver 14-1 to communication path 30. In this way, communication can be maintained with all bridging points and their associated remote stations despite a break in primary communication path 30. Switch 18-1 may be controlled either manually or automatically by transmitter-receiver 14-1 on the basis of the bridging point which it is desired to address.

Although switch 18-1 preferably disconnects transmitter-receiver 14-1 from communication path 30 when transmitter-receiver 14-1 is connected to the secondary communication path as described above, this is not essential. Transmitter-receiver 14-1 may remain connected to communication path 30 at all times. However, it is preferable to disconnect transmitter-receiver 14-1 from communication path 30 when communicating via the secondary communication path so that transmitter-receiver 14-1 is not inadvertently or intentionally disturbed by spurious signals on impaired communication path 30.

When the fault in dedicated primary communication path 30 has been corrected and all of bridging points 32, 34, etc. can again be addressed by way of that path, the secondary communication path through commercial telephone network 24 is no longer needed and can be broken. In a preferred embodiment, dial-up controller 16-1 transmits a return-to-primary command signal to dial-up receiver 44 or 64 by way of the secondary communication path. In response to this return-to-primary command signal, the dial-up receiver restores the associated switch 104 or 66 to its normal position in which the bridging point (and all bridging points beyond) are connected back to transmitter-receiver 14-1 by way of primary communication path 30. Correspondingly, switch 18-1 is again always positioned normally to connect communication path 30 to transmitter-receiver 14-1. Thereafter, dial-up controller 16-1 transmits a disconnect command signal to the dial-up receiver by way of the secondary communication path. In response to this disconnect command signal, the dial-up receiver reverts to an on-hook condition which breaks the secondary communication path through commercial network 24. Dial-up controller 16-1 will then also typically revert to an on-hook condition. The system is now back to its original condition in which communication with all bridging points and the associated remote stations is by way of primary communication path 30 and a secondary communication path through commercial telephone network 24 is not established again until needed to circumvent some failure of primary communication path 30.

Dial-up receivers 44 and 64 also preferably include means for detecting the breaking of the secondary communication path and for returning to an on-hook condition in response thereto. Switches 104 and 66 may also automatically return to their normal positions under these conditions. Dial-up receivers 44 and 64 may also include means for sensing the flow of information through the associated commercial telephone termination. If information is not detected within at least a predetermined minimum time interval, the bridging point responds as though the secondary communication path were broken (i.e., the dial-up receiver returns to an on-hook condition and switch 104 or 66 returns to its normal position).

Figure 2:
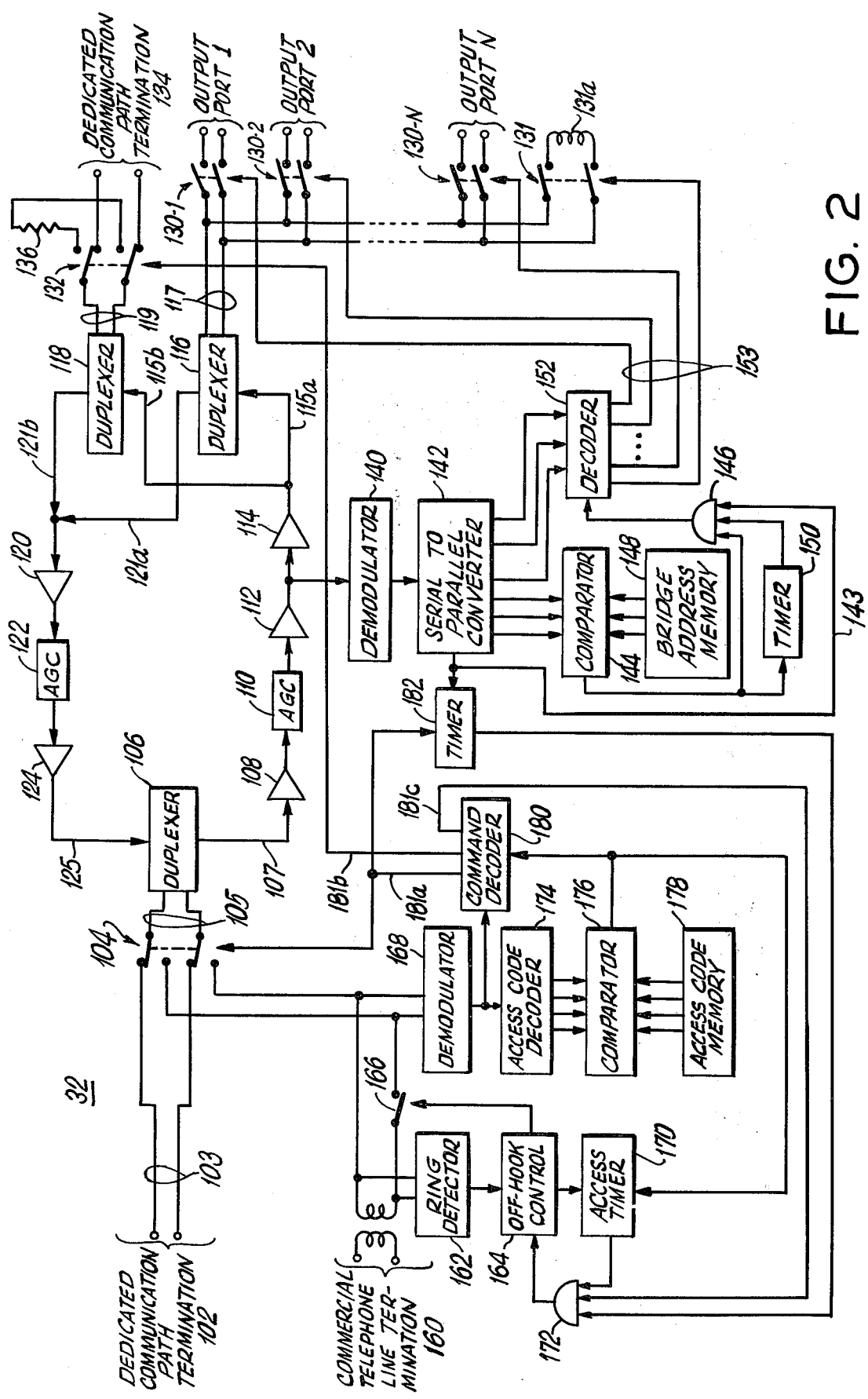
FIG. 2 is a schematic block diagram showing in greater detail an illustrative embodiment of a bridging point constructed in accordance with the principles of this invention for use in the central station system of FIG. 1.

FIG. 2 shows a typical bridging point (e.g., bridging point 32 in FIG. 1) in greater detail. Dedicated communication path 30 (FIG. 1) leading back to transmitter-receiver 14-1 is connected to termination 102. Termination 102 is shown having two terminals as is typically the case, for example, if communication path 30 is a voice-grade commercial telephone line. Termination 102 is normally connected to duplexer 106 through switch 104 which corresponds to switch 104 in FIG. 1. Termination 102 is connected to switch 104 by leads 103 and switch 104 is connected to duplexer 106 by leads 105. Duplexer 106 is a transformer device shown in greater detail in FIG. 5 which applies signals received on leads 105 to output lead 107 and substantially prevents those signals from being applied to input lead 105. Similarly, duplexer 106 applies signals received on input lead 125 to leads 105 for transmission back to central station transmitter-receiver 14-1 (FIG. 1) and substantially prevents those signals from being applied to output lead 107. Accordingly, signal information received from the central station is processed by the lower leg of the loop connected to duplexer 106. Signal information received from the remote stations connected to output ports 1-N of bridging point 32 or from bridging points farther out along communication path 30 and connected to bridging point 32 by way of termination 134 is processed by the upper leg of the loop connected to duplexer 106.

To compensate for transmission line losses, the signals applied to lead 107 are amplified and restored to normal level by amplifier 108, automatic gain control device 110, and amplifiers 112 and 114. Any or all of devices 108, 110, 112, and 114 may also perform filtering functions to attenuate noise signals and signals outside the frequency range used to transmit information from the central station to the bridging points and remote stations. In a preferred embodiment, bridge address signals are transmitted by means of alternating current (AC) signals (e.g., frequency shift keyed (FSK) signals) having frequency in a first frequency range; interrogation signals recognizable by the remote station devices are transmitted by means of AC signals having frequency in a second frequency range; and response signals generated by the remote station devices are transmitted by means of AC signals having frequency in a third frequency range. These three frequency ranges are preferably mutually exclusive. Devices 108, 110, 112, and 114 therefore transmit AC signals in the first and second frequency ranges and, in cascade, attenuate signals outside that range. Devices 120, 122, and 124, which process response signals, similarly transmit AC signals in the third frequency range and, in cascade, attenuate signals outside that range.

The amplified and normalized output signal of device 114 is applied to duplexers 116 and 118 by way of leads 115a and 115b. Duplexers 116 and 118 are transformer devices similar to duplexer 106. Accordingly, duplexer 116 applies the signals received on input lead 115a to leads 117 and substantially prevents those signals from being applied to output lead 121a. Similarly, duplexer 118 applies signals received on input lead 115b to leads 119 and substantially prevents those signals from being applied to output lead 121b. Signals applied to duplexer 116 or 118 by way of leads 117 or 119 are applied to output lead 121a or 121b and not to input lead 115a or 115b.

Duplexer 116 transmits signals to and from output ports 1-N of bridging point 32. These output ports correspond respectively to terminals 1-N of switch 130 in FIG. 1. Switches 130-1 through 130-N, sometimes referred to hereinafter as switches 130, correspond in aggregate to switch 130 in FIG. 1. Each of switches 130-1 through 130-N is normally open, electrically isolating all of the remote station devices connected to output ports 1-N from one another and from the remainder of the apparatus. One of switches 130 is closed as described below when the associated output port is addressed. When none of switches 130-1 through 130-N is closed, switch 131 is closed to connect duplexer 116 to a load 131a similar to the load represented by the apparatus connected to any of output ports 1-N. When any of switches 130-1 through 130-N is closed, switch 131 is opened.

Duplexer 118 transmits signals to and from bridging points farther out along dedicated communication path 30 (e.g., bridging point 34 in FIG. 1). Switch 132 is normally positioned to connect leads 119 to dedicated communication path termination 134. The next segment of dedicated communication path 30 is connected to termination 134. In the event of failure of the apparatus connected to termination 134, switch 132 can be repositioned as described below to connect duplexer 118 to load 136 to simulate the load normally represented by apparatus connected to termination 134. Switch 132 can also be permanently positioned to connect duplexer 118 to load 136 if this is the last bridging point on dedicated communication path 30 and termination 134 is unused.

Response signals applied to either of duplexers 116 or 118 are applied to output lead 121a or 121b as mentioned above. These signals are amplified and normalized by amplifier 120, automatic gain control device 122, and amplifier 124. As in the case of devices 108, 110, 112, and 114, devices 120, 122, and 124 compensate for transmission line losses and may also perform filtering operations to attenuate noise signals and signals outside a predetermined frequency range. The amplified and normalized output signals of device 124 are applied to duplexer 106 and thence back to the central station.

Figure 3:
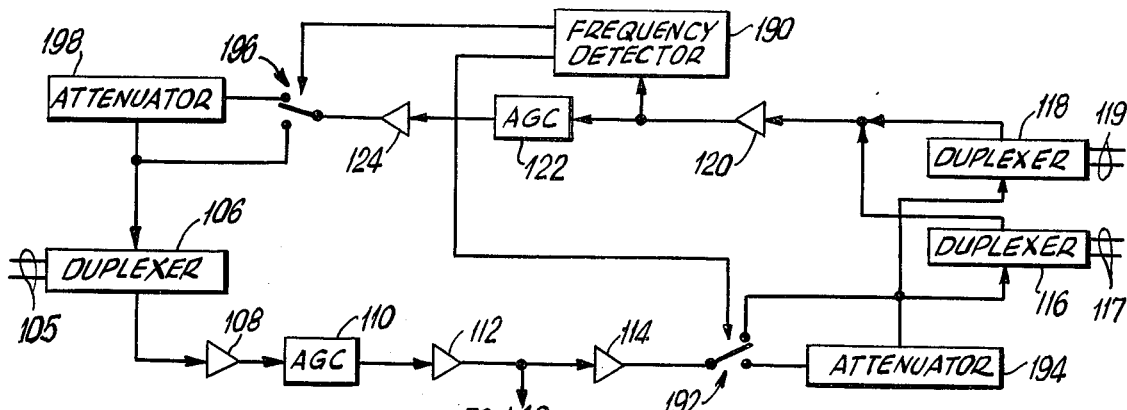
FIG. 3 is a schematic block diagram showing an alternative embodiment in accordance with the invention of a portion of the apparatus shown in FIG. 2.

FIG. 3 shows a modification of the transmission loop of FIG. 2 in which even greater electrical isolation is provided between the two legs of the loop. Frequency detector 190 is connected between elements 120 and 122 in the leg of the loop which processes reply signals. Frequency detector 190 detects signals of the frequency used to transmit reply signals and produces output signals for controlling switches 192 and 196 in response to the presence or absence of reply signals. When no reply signals are detected by frequency detector 190, switch 192 is positioned (as shown in FIG. 3) to bypass attenuator 194 in the leg of the loop which processes address and interrogation signals. At the same time, switch 196 is positioned (as shown in FIG. 3) to connect attenuator 198 into the circuit between element 124 and duplexer 106. Accordingly, signals in the reply leg of the loop (which should not and normally would not occur simultaneously with address or interrogation signals) are strongly suppressed or attenuated by attenuator 198, while signals in the address and interrogation leg of the loop are transmitted from leads 105 to leads 117 and 119 as described in connection with FIG. 2. When frequency detector 190 detects reply signals, the positions of switches 192 and 196 are reversed. Attenuator 194 is then connected into the circuit between element 114 and duplexers 116 and 118, while attenuator 198 is shunted or bypassed. Reply signals are therefore transmitted from leads 117 or 119 to leads 105 as described in connection with FIG. 2. Signals in the leg of the loop which processes address and interrogation signals (which should not and normally would not occur simultaneously with reply signals) are strongly suppressed or attenuated by attenuator 194. Attenuators 194 and 198 may be any devices for reducing signal amplitude, e.g., resistive networks. The modification shown in FIG. 3 is particularly useful where the loads connected to the duplexers are not well matched or balanced, thereby reducing the effectiveness of the duplexers in suppressing feedback in the loop.

Returning to FIG. 2, operation of output port section switches 130 (and load switch 131) is controlled by demodulator 140 and associated apparatus as will now be desribed. Output port address signals generated by the central station are processed by devices 108, 110, 112, and 114 in the lower leg of the loop connected to duplexer 106. These signals are therefore applied to demodulator 140. Demodulator 140 demodulates the AC address signals to produce a corresponding serial binary data signal. If the bridge address signals are transmitted using a unique frequency range, demodulator 140 preferably responds to signals only in that frequency range. Otherwise, the bridge address signals must be distinguishable from other signals generated by the central station (e.g., by having a unique configuration of one or more data bits which is recognizable, for example, by serial to parallel converter 142).

The serial binary data signal produced by demodulator 140 is applied to serial to parallel converter 142. Converter 142 stores the serial binary data in parallel form. When a complete address has been transmitted and stored in converter 142, converter 142 applies a gate enabling signal to logical AND gate 146 via lead 143. Generation of this gate enabling signal may be conditioned on various tests on the data word stored in converter 142. These tests may include parity and other error checks and determination that the data word is a valid bridging point output port address.

Comparator 144 compares the bridge address portion of the data word stored in converter 142 with the address of bridge 32 which is stored in bridge address memory 148. If the bridge address received in converter 142 without error is the address of bridge 32, the output port being addressed is one of the output ports of bridge 32. Comparator 144 produces a second gate enabling signal applied to AND gate 146 and to timer 150. If the bridge address in converter 142 does not match the bridge address stored in memory 148, the output port being addressed is at another bridging point and comparator 144 does not produce the second gate enabling signal.

Timer 150 produces a third gate enabling signal applied to AND gate 146 until a predetermined time after the second gate enabling signal is first produced by comparator 144. AND gate 146 is enabled when gate enabling signals are applied to all three of its input terminals. When AND gate 146 is enabled, it applies an enabling signal to decoder 152. Accordingly, when the bridge address stored in converter 142 is the same as the bridge address in memory 148, decoder 152 is enabled for a period of time determined by timer 150.

When decoder 152 is enabled as described above, it decodes the output port portion of the address stored in converter 142 to produce an output signal on the lead 153 which controls the switch 130 associated with the addressed output port. In response to this output signal, switch 130 for the addressed port closes, thereby connecting the addressed output port to duplexer 116. While any of switches 130 is closed, decoder 152 also produces an output signal for opening normally closed switch 131. Decoder 152 may include a timer for latching the selected switch 130 closed for a predetermined interval of time. Preferably, the address signals are transmitted using a unique frequency range so that converter 142 holds an address until a new address is transmitted. The selected switch 130 then remains closed until a new address is transmitted or until timer 150 disables decoder 152. The bridging point is thus arranged to automatically disconnect a selected bridging point after a predetermined time interval to prevent tampering with the system from a remote station. It will also be noted that duplexers 106, 116, and 118 prevent signals received via any bridging point output port from being applied to demodulator 140. The system therefore will not respond to output connection commands received via any bridging point output port.

When a selected switch 130 is closed as described above, interrogation signals generated by the central station are transmitted through duplexer 116 and the selected switch 130 to the remote station apparatus connected to the addressed output port. Similarly, response signals generated by the interrogated remote station are transmitted back to the central station through the selected switch 130 and duplexer 116. When a response signal has been received, the central station generates another address signal, releasing the previously selected switch and initiating the process required to select another of switches 130 or a similar switch at another bridging point.

In the event of failure of the dedicated communication path from the central station to termination 102, a secondary communication path is established from the central station through the commercial telephone path to commercial telephone line termination 160. This secondary communication path is initially established as described above in connection with FIG. 1 and a ringing signal is applied to termination 160. This ringing signal is detected by ring detector 162 which responds by triggering off-hook control 164. Off-hook control 164 closes switch 166 which completes the circuit from termination 160 to demodulator 168 and places the apparatus connected to termination 160 in an off-hook condition. This terminates the ringing signal.

When off-hook control 164 is first triggered, it also starts access timer 170. Access timer 170 applies a gate disabling signal to logical OR gate 172 until a predetermined time interval after it is triggered unless timer 170 is stopped by an output signal from comparator 176. The signals applied to the other input terminals of OR gate 172 are also normally gate disabling. When a gate enabling signal is applied to any of the input terminals of OR gate 172, that device produces an output signal which causes off-hook control 164 to reset and reopen switch 166, thereby placing the apparatus connected to termination 160 in an on-hook condition and causing the commercial telephone network to break the secondary connection. Accordingly, after off-hook control 164 first closes switch 166, access timer 170 begins to time. Unless the correct access code signals are received via the secondary communication path within the time allowed by access timer 170, off-hook control 164 is reset by the output signal of access timer 170 and the secondary connection is broken. Unauthorized individuals who may reach termination 160 through the commercial telephone network but who do not know the correct access code are thereby prevented from interfering with the system.

After switch 166 has been closed, access code signals, generated as described above in connection with FIG. 1, are transmitted to the bridging point via the secondary communication path. These signals are demodulated by demodulator 168 to produce corresponding serial binary data signals applied to access code decoder 174. Decoder 174 accumulates the serial binary data and applies it in parallel form to comparator 176. Comparator 176 compares the received access code with the access code of bridging point 32 which is stored in access code memory 178. If the received access code is the correct one, comparator 176 produces an output signal which stops access timer 170 and enables command decoder 180.

When command decoder 180 has been enabled, command signals, generated as discussed above in connection with FIG. 1, are transmitted to bridging point 32 via the secondary communication path. These signals are demodulated by demodulator 168 and decoded by command decoder 180. If the received command calls for the bridging point to disconnect itself from termination 102 and communicate with the central station via the secondary communication path, command decoder 180 produces an output on lead 181a which causes switch 104 to connect termination 160, rather than termination 102, to duplexer 106. Bridging point 32 is then able to receive address and interrogation signals from the central station via the secondary communication path. Similarly, response signals are transmitted from bridging point 32 back to the central station via the secondary communication path.

The command decoder output signal on lead 181a also enables timer 182 which normally applies a gate disabling signal to OR gate 172. When timer 182 is enabled, it begins a timing operation which is restarted each time converter 142 produces a gate enabling output signal to indicate that an address signal has been received. If an address signal is not received within a predetermined time interval established by timer 182, timer 182 produces a gate enabling output which is applied to OR gate 172. Like any other gate enabling signal applied to OR gate 172, this signal causes off-hook control 164 to open switch 166, thereby placing the apparatus connected to termination 160 in an on-hook condition and breaking the secondary communication path. The characteristic time interval of timer 182 is selected to be relatively long compared to the normal interval between address signals. Accordingly, timer 182 operates to break the secondary communication path only if an address signal is not received within a relatively long interval after duplexer 106 is first connected to the secondary communication path, or with a certain minimum frequency thereafter. This provides still another level of protection against unauthorized tampering with the system via the commercial telephone network. Even if an unauthorized individual is able to gain access to bridging point 32 via the commercial telephone network and cause the bridging point to disconnect itself from the dedicated communication path, timer 182 causes the bridging point to break the secondary communication path unless address signals are received within a predetermined time interval after the bridging point is connected to the secondary communication path and with a certain minimum frequency thereafter. This also further protects the system if inadvertent interruption of the secondary communication path occurs.

Other commands can be transmitted to bridging point 32 via the secondary communication path and decoded by decoder 180. In response to one such command, decoder 180 produces an output signal on lead 181b which causes switch 132 to disconnect duplexer 118 from termination 134 and to connect it to load 136 instead. In this way, a fault in dedicated communication path 30 beyond bridging point 32 which may interfere with communication with bridging point 32 can be isolated from the circuit.

In response to other commands, decoder 180 produces output signals on leads 181a and/or 181b for restoring switches 104 and/or 132 to their normal positions whereby bridging point 32 is again connected to the dedicated communication path. In response to still another command, decoder 180 produces a gate enabling output signal on lead 181c which causes off-hook control 164 to open switch 166, thereby breaking the secondary communication path.

Ring detector 162 may also detect dial tone applied to termination 160 in the event that the secondary communication path is prematurely broken. In that event, ring detector 162 caused off-hook control 164 to open swtich 166, thereby restoring the apparatus connected to termination 160 to an on-hook condition. Switches 104 and 132 may also automatically return to their normal positions whenever the apparatus connected to termination 160 is in an on-hook condition.

Figure 4:
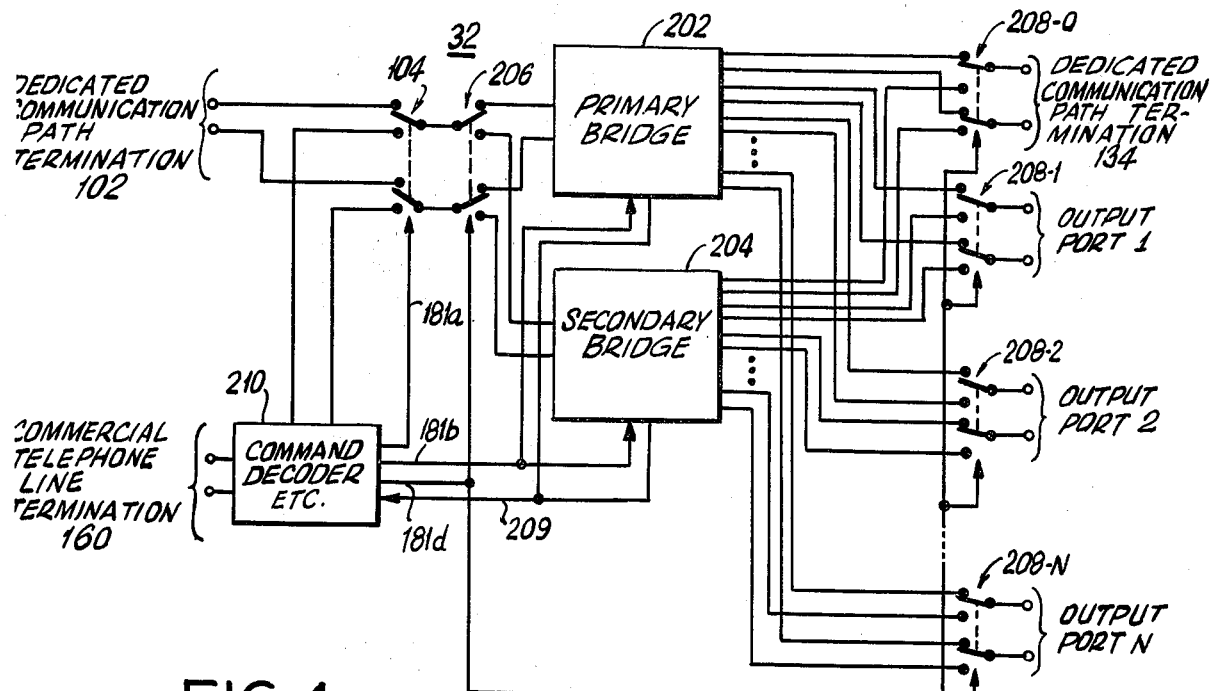
FIG. 4 is a schematic block diagram showing an alternative embodiment in accordance with the invention of the apparatus of FIG. 2.

FIG. 4 shows an alternative embodiment of the bridging point apparatus of this invention in which principal elements of the bridging point transmission and control apparatus are provided in duplicate to protect the system against failure of any of the duplicated apparatus. As shown in FIG. 4, typical bridging point 32 includes primary bridge 202 and identical secondary bridge 204. Each of primary and secondary bridges 202 and 204 includes all of the following elements arranged as shown in FIG. 2: 106, 108, 110, 112, 114, 116, 118, 120, 122, 124, 130, 131, 131a, 132, 136, 140, 142, 144, 146, 148, 150, and 152. Bridges 202 and 204 may alternatively be constructed as shown in FIG. 3. Either of bridges 202 and 204 can be connected to either dedicated communication path 102 or commercial telephone termination 160 via switches 104 and 206. Similarly, either of bridges 202 and 204 can be connected to dedicated communication path termination 134 and output ports 1-N via switches 208-0 through 208-N. Switches 206 and 208 are all operated together so that only one of bridges 202 and 204 is thus connected in the transmission circuit at any time. Switches 206 and 208 are shown positioned in FIG. 4 to connect primary bridge 202 in the transmission circuit. Accordingly, primary bridge 202 transmits signals between termination 102 (or 160) on the one hand and termination 134 and output ports 1-N on the other hand. Secondary bridge 204 is not in use.

In the event of failure or malfunction of primary bridge 202, all of switches 206 and 208 are repositioned by remote command to disconnect primary bridge 202 from the transmission circuit and to connect secondary bridge 204 into the transmission circuit instead.

Switches 206 and 208 are controlled by the apparatus labelled "command decoder etc.", and referred to for convenience herein as command decoder 210. Command decoder 210 includes the following elements arranged as shown in FIG. 2: 162, 164, 166, 168, 170, 172, 174, 176, 178, 180, and 182. These elements of the apparatus shown in FIG. 2 are not provided in duplicate in the embodiment shown in FIG. 4. Command decoder 210 decodes various command signals received from the central station via commercial telephone termination 160 and produces control signals on leads 181a, b, etc., as described above in connection with FIG. 2. Lead 209 corresponds to the connection from serial to parallel converter 142 to timer 182 in FIG. 2.

In the embodiment shown in FIG. 4, command decoder 210 produces an additional output signal on lead 181d for controlling switches 206 and 208. The signal on lead 181d is generated in the same manner as the signals on leads 181a–c in response to a command signal received from the central station via commercial telephone termination 160. Bridging point 32 can therefore be switched from operating with primary bridge 202 to operating with secondary bridge 204 or vice versa by appropriate commands from the central station. If desired for testing purposes, switches 206 and 208 (as well as any other switches in the bridging point apparatus) can also be made controllable at the bridging point itself.

Figure 5:
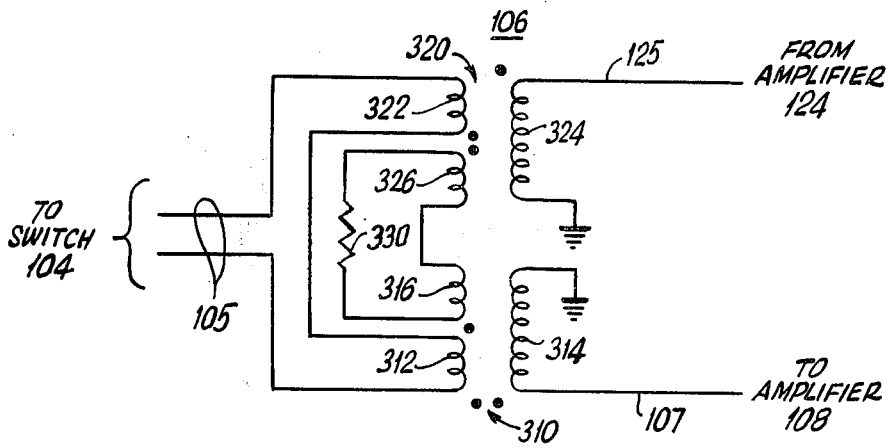
FIG. 5 is a schematic diagram showing in greater detail a typical duplexer employed in the bridging point of FIG. 2.

FIG. 5 shows duplexer 106 in greater detail. Duplexer 106 includes two separate transformer sections 310 and 320. In transformer 310, coils 312 and 316 are inductively coupled to coil 314. The polarity of the coupling is indicated by the dots adjacent one end of each coil. Similarly, in transformer 320, coils 322 and 326 are inductively coupled to coil 324 with polarity indicated by the dots. Coils 312 and 322 are connected in series across conductors 105. Coil 314 is connected in series between the input terminal of amplifier 108 and ground. Coil 324 is connected in series between the output terminal of amplifier 124 and ground. Coils 316 and 326 are connected in series across load 330 which is approximately the same as the load represented by the apparatus connected to leads 105 through switch 104 (e.g., transmission path 30).

Signals applied to leads 105 through switch 104 cause coil 312 to induce corresponding signals in coils 314 and 316. The signal induced in coil 314 is applied to amplifier 108. The signal induced in coil 316 is applied to coil 326. Because 326 is polarized oppositely from coil 322, the signal induced in coil 324 by coil 322 is substantially cancelled by the signal induced in coil 324 by coil 326. Accordingly, signals applied to duplexer 106 from leads 105 are transmitted at close to full amplitude to lead 107 but are substantially attenuated to lead 125.

Signals applied to lead 125 from the output terminal of amplifier 124 cause coil 324 to induce corresponding signals in coils 322 and 326. The signal induced in coil 322 is applied to coil 312 and leads 105. The signal induced in coil 326 is applied to coil 316 through load 330. Since coils 312 and 316 are polarized oppositely relative to the polarity of corresponding coils 322 and 326, the signals induced in coil 314 by coils 312 and 316 tend to cancel one another so that substantially no net signal is induced in coil 314. Accordingly, signals applied to duplexer 106 from lead 125 are transmitted to leads 105 but are not fed back via lead 107.

Duplexers 116 and 118 may be similar to duplexer 106.

It is to be understood that the embodiments shown and described herein are illustrative of the principles of this invention only, and that various modifications may be made by those skilled in the art without departing from the scope and spirit of the invention. For example, the number and sequence of amplifier and automatic gain control devices connected between duplexer 106 and duplexers 116 and 118 may be varied depending on the extent to which compensation is required for transmission path losses.

What is claimed is:

1. In a central station system including a central station, at least one remotely located bridging point having a plurality of output ports and serving a plurality of remote stations, each of which is connected to a respective one of the output ports, and normal telecommunication means for transmitting signals between the central station and the bridging point, apparatus for connecting the central station to selected remote stations comprising:

means associated with the central station for generating address signals applied to the normal telecommunication means;

means associated with the bridging point for connecting the normal telecommunication means to the output port identified by the address signals and for isolating all other output ports form the normal telecommunication means; and means for establishing an alternative telecommunication path between the central station and the bridging point through the commercial telephone network to which the address signals are applied and the identified output port is connected in the event of failure of the normal telecommunication means.

2. The apparatus defined in claim 1 wherein the means for establishing an alternative telecommunication path comprises:

first and second commerical telephone terminations respectively associated with the central station and the bridging point;

means associated with the central station for modulating the signals applied to the first commercial telephone termination to dial the number of the second commercial telephone termination;

first means associated with the bridging point for establishing an off-hook condition at the second commercial telephone termination in response to the application of ringing signal thereto; and second means associated with the bridging point for connecting the bridging point to the alternative telecommunication path when the first means establishes an off-hook condition at the second commercial telephone termination.

3. The apparatus defined in claim 3 wherein the means for establishing an alternative telecommunication path further comprises means associated with the central station for disconnecting the central station from the normal telecommunication means when the central station is connected to the alternative telecommunication path.

4. The apparatus defined in claim 2 further comprising means associated with the bridging point for disconnecting the bridging point from the normal telecommunication means when the second means connects the bridging point to the alternative telecommunication path.

5. The apparatus defined in claim 1 wherein the means for establishing an alternative telecommunication path comprises:
  first and second commercial telephone terminations respectively associated with the central station and the bridging point;
  signal decoder means associated with the bridging point for producing an output signal in response to a predetermined code signal received by way of the second commercial telephone termination;
  means associated with the central station for modulating the signals applied to the first commercial telephone termination to dial the number of the second commercial telephone termination, whereby the alternative telecommunication path is established between the first and second commercial telephone terminations and a ringing signal is applied to the second commercial telephone termination;
  means associated with the bridging point for connecting the second commercial telephone termination to the signal decoder means in response to the application of the ringing signal to the second commercial telephone termination;
  means associated with the central station for applying the predetermined code signal to the first commercial telephone termination;
  means associated with the bridging point for disconnecting the bridging point from the normal communciation path and connecting the bridging point to the second commercial telephone termination in response to the output signal of the signal decoder means; and
  means associated with the central station for disconnecting the central station from the normal telecommunication means and connecting the central station to the first commercial telephone termination.

6. The apparatus defined in claim 5 further comprising means associated with the bridging point for disconnecting the bridging point from the second commercial telephone termination and reconnecting the bridging point to the normal telecommunication means in response to the breaking of the alternative telecommunication path.

7. The apparatus defined in claim 6 further comprising means associated with the bridging point for disconnecting the signal decoder means from the second commercial telephone termination in response to the breaking of the alternative telecommunication path.

8. The apparatus defined in claim 1 further comprising means associated with the bridging point for breaking the connection between the normal or alternative telecommunication paths and the identified output port a predetermined time interval after the connection is made.

9. A central station system comprising:
  a central station including means for generating address signals;
  at least one remotely located bridging point having an input port and a plurality of output ports;
  a plurality of remote stations, each of which is connected to a respective one of the output ports;
  normal telecommunication means for transmitting signals between the central station and the bridging point and having first and second terminations respectively associated with the central station and the bridging point;
  alternate telecommunication means for transmitting signals between the central station and the bridging point through the commercial telephone network and having third and fourth terminations respectively associated with the central station and the bridging point;
  first switching means associated with the central station for normally connecting the means for generating address signals to the first termination;
  second switching means associated with the bridging point for normally connecting the input port to the second termination;
  means associated with the bridging point for connecting the input port to the output port identified by the address signals applied to the input port;
  means associated with the central station for selectively activating the alternative telecommunication means by modulating the signal applied to the third termination to dial the fourth termination;
  means associated with the bridging point for operating the second switching means to connect the fourth termination to the input port in response to the application of a ringing signal to the fourth termination; and
  means associated with the central station for operating the first switching means to connect the means for generating address signals to the third termination.

10. The apparatus defined in claim 9 wherein said means for operating the second switching means comprises signal decoder means for producing an output signal for operating the second switching means in response to a predetermined code signal received by way of the fourth termination after the application of a ringing signal to the fourth termination, and wherein the means for modulating the signal applied to the third termination comprises means for applying the predetermined code signal to the third termination after dialing the fourth termination.

11. The apparatus defined in claim 10 wherein said signal decoder means comprises timer means for breaking the connection through the commercial telephone network to the fourth termination if said predetermined code signal is not received within a predetermined time after application of a ringing signal to the fourth termination.

12. The apparatus defined in claim 9 wherein said means for operating the second switching means comprises means for reconnecting the input port to the second termination in response to the breaking of the alternate telecommunication means.

13. The apparatus defined in claim 9 wherein the means for connecting the input port to the identified output port electrically isolates all output ports other than the identified output port from the input port.

14. The apparatus defined in claim 9 wherein the means for connecting the input port to the identified output port includes means for disconnecting the input port from the identified output port a predetermined time interval after the connection is first made.

15. The apparatus defined in claim 9 wherein the means for operating the second switching means includes means for reconnecting the input port to the second termination if address signals are not received via the fourth termination with at least a predetermined minimum frequency.

16. The apparatus defined in claim 15 wherein the means for operating the second switching means further includes means for breaking the alternate telecommunication means if address signals are not received via the fourth termination with at least a predetermined minimum frequency.

17. The apparatus defined in claim 9 wherein the central station includes means for successively generating address signals of a first predetermined frequency, interrogation signals of a second predetermined frequency, and receiving reply signals of a third predetermined frequency, all of said frequencies being mutually exclusive; wherein the means for connecting the input port to the output port includes duplexer means for permitting signals of the second frequency to flow only from the input port to the output port and for permitting signals of the third frequency to flow only from the identified output port to the input port; and wherein each remote station includes means responsive to interrogation signals generated by the central station and received via the bridging point for generating reply signals transmitted to the central station via the bridging point.

18. In a central station system including a central station, at least one remotely located bridging point having an input port and a plurality of output ports, a plurality of remote stations, each of which is connected to a respective one of the output ports, and telecommunication means for transmitting signals between the central station and the input port, apparatus for connecting the central station to selected remote stations comprising:

means associated with the central station for selectively generating command signals and output port identifying signals applied to the telecommunication means;

first and second bridge means associated with the bridging point, each of said bridge means including an input terminal, a plurality of output terminals each associated with a respective one of the output ports, and means for connecting the input terminal to the output terminal associated with the output port identified by the output port identifying signals applied to the input terminal; and means associated with the bridging point for connecting the input port to the input terminal of the one of the first and second bridge means identified by the command signals applied to the input port and for connecting the output terminals of the identified bridge means to the associated output ports.

* * * * *

UNITED STATES PATENT AND TRADEMARK OFFICE
CERTIFICATE OF CORRECTION

PATENT NO. : 4,119,815
DATED : October 10, 1978
INVENTOR(S) : Eric J. Frankfort and David S. Terrett It is certified that error appears in the above—identified patent and that said Letters Patent are hereby corrected as shown below:

| Column | Line | |
|---|---|---|
| 7  | 44 | "40" should be --130-- |
| 11 | 23 | "105" should be --125-- |
| 17 | 53 | after "Because" insert --coil-- |
| 18 | 31 | "form" should be --from-- |
| 18 | 58 | "3" should be --2-- |

Signed and Sealed this

Twenty-fourth Day of April 1979

[SEAL]

Attest:

RUTH C. MASON
Attesting Officer

DONALD W. BANNER
Commissioner of Patents and Trademarks